United States Patent [19]

Niederdellmann et al.

[11] 4,250,292

[45] Feb. 10, 1981

[54] PROCESS FOR THE PREPARATION OF POLYURETHANE ELASTOMERS IN WHICH AT LEAST TWO REACTANT PORTIONS ARE INTRODUCED INTO SEPARATE POSITIONS OF A SCREW MACHINE

[75] Inventors: Georg Niederdellmann, Dormagen; Wilhelm Goyert, Cologne; Ernst Meisert, Leverkusen; Alfred Eitel; Hans Wagner, both of Dormagen; Hans Hespe, Leverkusen, all of Fed. Rep. of Germany

[73] Assignee: Bayer Aktiengesellschaft, Leverkusen, Fed. Rep. of Germany

[21] Appl. No.: 74,943

[22] Filed: Sep. 13, 1979

[30] Foreign Application Priority Data

Sep. 30, 1978 [DE] Fed. Rep. of Germany ....... 2842806

[51] Int. Cl.³ .................................................. C08G 18/08
[52] U.S. Cl. ....................................... 528/44; 528/49; 528/69
[58] Field of Search ................................ 528/44, 49, 69

[56] References Cited

U.S. PATENT DOCUMENTS

| 3,312,666 | 4/1967 | Knipp et al. ............................ 528/48 |
| 3,642,964 | 2/1972 | Rausch et al. .......................... 528/83 |
| 3,963,679 | 6/1976 | Ulrich et al. ............................ 528/45 |

FOREIGN PATENT DOCUMENTS

| 1106959 | 5/1961 | Fed. Rep. of Germany . |
| 1024381 | 3/1966 | United Kingdom . |
| 1057018 | 2/1967 | United Kingdom . |
| 1508317 | 5/1974 | United Kingdom . |

OTHER PUBLICATIONS

Saunders et al., Polyurethanes II, Interscience, NY, 1964, p. 201.

*Primary Examiner*—Maurice J. Welsh
*Attorney, Agent, or Firm*—Gene Harsh; Joseph C. Gil

[57] ABSTRACT

The present invention relates to an improved continuous process for the preparation of polyurethane elastomers which are distinguished from the products produced by known processes by increased elasticity, reduced shrinkage, higher rigidity (limit bending stress), improved cold notched bar impact resistance and good thermal stability.

10 Claims, 1 Drawing Figure

PROCESS FOR THE PREPARATION OF POLYURETHANE ELASTOMERS IN WHICH AT LEAST TWO REACTANT PORTIONS ARE INTRODUCED INTO SEPARATE POSITIONS OF A SCREW MACHINE

BACKGROUND OF THE INVENTION

Thermoplastic polyurethane elastomers based on polyisocyanates, polyhydroxyl compounds and chain extenders are described in detail in "Kunststoff-Handbuch", (Volume VII) by Vieweg-Höchtlen, Carl-Hanser-Verlag. Various processes have been disclosed for the commercial preparation of such plastics, and are described, for example, in German Auslegeschriften Nos. 1,106,959, 1,157,772 and 1,165,852; British Pat. No. 1,057,018; and German Offenlegungsschriften Nos. 2,059,570; 2,423,764; and 2,302,564 corresponding to U.S. Pat. No. 3,963,679.

The process according to the last two German Offenlegungsschriften mentioned is of particular interest. In that process, polyurethanes or polyurethane ureas with good mechanical properties can be produced continuously, in a technically simple manner, by reacting polyisocyanates directly with polyols or amino functional compounds in a double-shaft screw machine having a self-cleaning screw geometry.

All of the above-mentioned processes for the preparation of polyurethane elastomers are either "one shot" or "prepolymer" processes and theoretically lead to polymers having a random distribution of the "flexible segments" produced from polyisocyanate and polyol of higher molecular weight on the one hand and from the "rigid segments" formed from polyisocyanate and chain extender on the other hand. In practice, however, the variations in the reactivity of the commercial starting components, familiar to anyone skilled in the art, frequently cause deviations, to different extends, from the purely random distribution of rigid and flexible segments and therefore lead to production batches having a broad spectrum of properties even if the formulation and reaction conditions remain constant. Many applications of these elastomers, therefore, require an extremely large outlay for testing and selection at a later stage.

The need therefore arises for a process for the commercial production of polyurethane elastomers from polyols of relatively high molecular weight, chain extenders and polyisocyanates, which does not have these disadvantages and which leads to high quality of elastomers having a reproducible quality level, regardless of different qualities of raw material.

DESCRIPTION OF THE INVENTION

Figure 1:
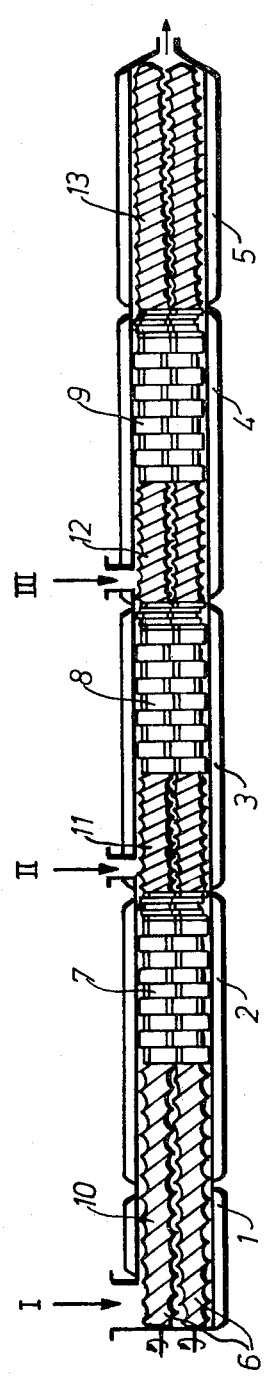
FIG. 1 represents a screw machine which may be used for the process according to the instant invention.

It has surprisingly been found that this objective can be achieved by modifying the known processes for the production of polyurethanes in extruders, preferably according to the already mentioned German Offenlegungsschriften Nos. 2,302,564 and 2,423,764, by introducing at least one of the above-mentioned starting components (polyisocyanate; polyhydroxyl compound of relatively high molecular weight; chain extender), in at least two portions, at separate places, into the screw machine. Reproducibly homogeneous elastomers having properties which are clearly improved relative to the prior art are obtained in this way.

The present invention therefore relates to a process for the continuous preparation of polyurethane and polyurethane urea elastomers by reaction of:

(a) a polyisocyanate, (b) a polyhydroxyl compound having a molecular weight of from 400 to 10,000, (c) a chain extender containing at least two Zerewitinoff-active hydrogen atoms, having a molecular weight below 400, and optionally, (d) a monoisocyanate and/or a compound which is monofunctional toward isocyanates, (e) and/or activators, stabilizers, lubricants and other additives, in an extruder, preferably in a double shaft screw machine, with screw shafts rotating in the same direction, and self-cleaning screw geometry, at a temperature of between 70° and 260° C., and in a viscosity range, in the screw machine, of about 0.01 to 300 Pa.S, wherein preferably the critical reaction phase in which the reaction mixture is very tacky and has a viscosity in the range of between 10 and 100 Pa.s, in particular 20 to 70 Pa.s, will pass through a screw zone, with intensively mixing kneading elements, under the action of a kneading frequency of from 1 to 20 Hertz, and at a velocity gradient in the radial clearance between comb and housing wall of more than 2000 sec$^{-1}$, characterized in that one or two of the components (a), (b) and/or (c) is introduced in at least two portions, at separate points of the screw machine, each portion amounting to at least 4% by weight, preferably more than 10% by weight, of the total amount of the respective component.

Screw machines and kneading elements which are suitable for the process according to the invention are described in detail e.g. in German Offenlegungsschriften Nos. 2,302,564; 2,423,764; and 2,549,372 and U.S. Pat. No. 3,963,679. In contrast to these known processes, at least one of the starting components is introduced into the extruder in at least two portions, according to the invention. For this purpose, the screw machine has a second inlet opening which in the prefered embodiment of the present invention is downstream of the first kneading zone which is essential to the above-mentioned invention according to German Offenlegungsschriften Nos. 2,302,564; 2,423,764; and 2,549,372, in which kneading zone the reaction mixture passes through the critical reaction phase at a viscosity of from 10 to 100 Pa.s, in particular 20 to 70 Pa.s. The second portion of the reactant can be added through this second inlet opening. Since the viscosity of the reaction mixture generally falls below the critical value of about 100 Pa.s in this way, it is preferred according to the present invention to place another kneading zone downstream this second feed point. The extruder can obviously also have a third inlet opening, preferably downstream of this second kneading zone, through which a third portion of the reactant can be added if necessary. Another kneading zone is preferably connected to it.

A screw machine which is particularly suitable for the process according to the invention is illustrated diagrammatically in FIG. 1: The reference numeral 6 indicates the two screw shafts rotating in the same direction, on which are arranged screw conveying zones 10, 11, 12 and 13 and kneading zones 7, 8 and 9. I, II and III represent three inlet openings for the various portions of the reactants. If desired, it is possible to shift the critical reaction phase defined above into a kneading zone 7, 8 or 9 by suitable temperature control in the housing zones 1, 2, 3, 4 and 5 which can be heated or cooled and/or by the addition of catalyst. The viscosity in the individual zones of the screw machine can be calculated from the viscosity profile of a similar reaction composition in a vessel with a stirrer and the residence time of the reaction mixture in the extruder. It is simpler to measure the viscosity of the reaction mixture in the screw machine directly using lateral flow viscometers connected in parallel, of the type marketed, for example, by the company Herbert K. Bruss, Bad Soden/Taunus, Federal Republic of Germany (see also the article by Herbert K. Bruss in "Chemie-Anlagen+- Verfahren", No. 10/1970, Konradin-Verlag, Stuttgart). The principle of the present invention is preferably embodied in one of the three variations of the process described in more detail below, that is (1) by primary build-up of rigid segment regions, (2) by primary build-up of flexible segment regions or (3) by secondary rigid segment injection.

Since a pure rigid segment produced in a primary manner would demand undesirably high reaction temperatures for obtaining a homogeneous reaction composition, because of its high melting temperature, a process is adopted in variation (#1) according to the invention (cf. Examples 1 and 2 and FIG. 1), utilizing the inherent difference in reactivity between the chain extender and the polyhydroxyl compound, in which the total quantity of the polyisocyanate and the chain extender as well as from 10 to 50% by weight, preferably from 20 to 30% by weight of the polyhydroxyl compound are metered into the feed position 1 of the screw machine in the absence of catalysts and at a relatively low temperature of about 50° to 90° C., and the remaining residual quantity of the polyhydroxyl compound is metered into one of the subsequent feed positions II or III of the screw machine at a temperature which is preferably elevated to about 120° to 200° C., and preferably using catalysts. The rigid segment which is finely dispersed in the polyhydroxyl component initially forms in this manner following a temperature profile rising from about 70° C. to 140° C. (housing temperature), while the flexible segment is subsequently formed in a reaction which is preferably catalyzed, at a temperature profile falling from about 200° C. to 100° C. (housing temperature).

In variation (#2) of the process according to the invention, the total quantity of the polyhydroxyl compound and a sufficiently large portion of the polyisocyanate are initially introduced into the feed position I of the screw machine first to form units of flexible segment containing intermediary hydroxyl or terminal isocyanate groups at molar ratios of 1.2:1 to 3:1 or 0.6:1 to 0.9:1. The remaining quantity of the polyisocyanate and the total quantity of the chain extender are added via the feed positions II and/or III of the screw machine separately or together, the previously formed flexible segment regions being bonded by the rigid segment sequences subsequently formed. The molar ratio of isocyanate groups to the total of all Zerewitinoff-active groups, based on the total reaction, is between 0.90 and 1.20, preferably between 0.97 and 1.10 in variations (#1) and (#2) of the process.

In variation (#3) of the process according to the invention, a flexible polyurethane elastomer is first produced as an intermediate and rigid segment regions are bonded into the polyurethane elastomer as desired, in a subsequent second stage of the reaction. For this purpose, the total quantity of the polyhydroxyl compound; 10 to 80% by weight, preferably 15 to 75% by weight, particularly preferably 30 to 60% by weight, of the polyisocyanate; and 5 to 75% by weight, preferably 10 to 70% by weight, and particularly preferably 25 to 50% by weight of the chain extender are initially added via the feed position I and the remaining amounts of the diisocyanate and the chain extender are added separately or together via the feed positions II and/or III of the screw machine, wherein the molar ratio of the free isocyanate groups to the sum of all Zerewitinoff-active groups, based both on the first stage of the reaction and on the total reaction, is between 0.90 and 1.20, preferably between 0.97 and 1.10.

Suitable, substantially linear hydroxyl compounds having molecular weights of between 400 and 10,000, preferably between 450 and 6000 according to the invention include virtually all polyester, polylactones, polyethers, polythioethers, polyester amides, polycarbonates, polyacetals, vinyl polymers such as, for example, polybutadiene diols, polyhydroxyl compounds already containing urethane or urea groups, optionally modified natural polyols preferably containing two Zerewitinoff-active groups (essentially hydroxyl groups) and optionally also containing a small quantity of polyols containing three Zerewitinoff-active groups as well as compounds containing other Zerewitinoff-active groups such as amino, carboxyl or thiol groups. These compounds are known in the prior art and are described in detail, for example, in German Offenlegungsschriften Nos. 2,302,564; 2,423,764; and 2,549,372 (U.S. Pat. No. 3,963,679) and 2,402,840 (U.S. Pat. No. 3,984,607) and German Auslegeschrift No. 2,457,387 (U.S. Pat. No. 4,035,213). Polyesters, containing hydroxyl groups, prepared from glycols and adipic acid, phthalic and/or terephthalic acid, and their hydration products, hydroxyl polycarbonates, polycaprolactones, polyethylene oxide, polypropylene oxide, polytetrahydrofuran and mixed polyethers from ethylene oxide and propylene oxide are preferably used according to the invention.

Polyisocyanates which can be used according to the invention include the aliphatic, cycloaliphatic, aromatic, araliphatic and heterocyclic diisocyanates, and may also contain a proportion of known triisocyanates, of the type described, for example, in the above-mentioned German Offenlegungsschriften Nos. 2,302,564; 2,423,764, 2,549,372; 2,402,840; and 2,457,387. Diisocyanates which are preferably used according to the invention include optionally substituted hexamethylene diisocyanate; isophorone diisocyanate; lysine ester diisocyanates, the various toluylene, diphenyl methane and xylylene diisocyanates and the hydration products thereof.

The chain extenders to be used according to the invention, that is to say compounds of low molecular weight containing hydroxyl groups and/or amino groups and/or thiol groups and/or carboxyl groups are also known and are described, for example, in German Offenlegungsschriften Nos. 2,302,564; 2,549,372; 2,402,799; 2,402,840; 2,423,764; 2,457,387; and 2,644,923.

Glycols such as, for example, ethylene glycol; di and tri-ethylene glycol; propane diol-(1,2); butane diol-(1,3) and -(1,4); hexane diol-(1,6); 2-ethyl hexane diol-(1,3); 2,2-dimethyl propane diol; 1,4-bis-hydroxymethyl cyclohexane and hydroquinone dihydroxy ethyl ether are preferably used according to the invention. Ethylene glycol; diethylene glycol; propane diol-(1,2); butane diol-(1,3) and -(1,4) and hexane diol-(1,6) are particularly preferred.

Monoisocyanates or compounds which are monofunctional toward isocyanates can also be used as so-called chain breakers in proportions of from 0.01 to 10% by weight, based on the polyurethane solids. Monofunctional compounds of this type include, for example, monoamines such as butyl and dibutyl amine; octyl amine; stearyl amine; N-methyl stearyl amine; pyrrolidine; piperidine and cyclohexyl amine; monoalcohols such as butanol; 2-ethyl hexanol; octanol; dodecanol; the various amyl alcohols, cyclohexanol; ethylene glycol and monoethyl ether.

The process according to the invention can be carried out in the presence of conventional stabilizers, lubricants, dyes, pigments and other additives such as for example fillers and strengtheners, and other thermoplastics.

The reaction between the reactants can be accelerated using the conventional catalysts for isocyanate reactions in quantities of from 0.0001 to 5% by weight, preferably from 0.0005 to 2% by weight, based on polyurethane solids. Suitable catalysts include, for example, tertiary amines, such as triethyl amine; N-methyl morpholine; N,N,N',N'-tetramethylethylene diamine; 1,4-diazabicyclo-(2,2,2)-octane; N,N-dimethylbenzylamine; 2-methylimidazole; organometallic compounds such as, for example, zinc octoate; tin(II)-octoate; dibutyl tin-(IV)-dilaurate; iron acetyl acetonate; titanium tetrabutylate, dioctyl tin (IV)-diacetate etc., as well as bases such as tetraalkylammonium hydroxides, sodium hydroxide and sodium phenolate.

Other examples of catalysts to be used according to the invention, as well as details about the mode of operation of the catalysts are described in "Kunststoff-Handbuch", Volume VII, edited by Vieweg and Höchtlen, Carl-Hanser-Verlag, Munich 1966, for example on pages 96 to 102.

Depending on their degree of cross-linking, the elastomers produced according to the invention can be processed thermoplastically and/or from their solution in an organic solvent or mixture of organic solvents in a known manner.

The examples given below serve to illustrate the invention without restricting it. All of the examples were carried out using the double screw shaft machine described below and illustrated diagrammatically in FIG. 1.

A double-shaft, self-cleaning screw machine of the ZSK 53 type made by the Company Werner and Pfleiderer having the following dimensions:

| | |
|---|---|
| Shaft diameter: | 53 mm |
| Length of shaft: | 2220 mm |
| Length of kneading zones: | 150 mm (7), 300 mm (8), 180 mm (9) |
| Length of conveying zones: | 570 mm (10), 510 mm (11), 180 mm (12), 330 mm (13) |
| Radial Clearance: | about 0.1 mm |
| Rotational speed: | 300 RPM |
| Product throughput: | about 80 kg/hr | has been used in the following examples. As in FIG. 1, the extruder has been provided with three inlet openings and 5 housing zones which can be heated or cooled.

EXAMPLE 1(a) (comparison)

100.0 parts by weight of a mixed polyester composed of adipic acid, butane diol-1,4 and ethylene glycol (hydroxyl number=55.4; acid number=0.7), which had been activated using 10 ppm of titanium tetrabutylate, 0.3 parts by weight stearyl amide, 25.0 parts by weight butane diol-1,4 as well as 84.2 parts by weight liquid 4,4'-diisocyanato-diphenylmethane were continuously introduced, simultaneously, in a constant proportion, into the feed position I of the double-shaft screw machine and reacted in accordance with Example 4 of German Offenlegungsschrift No. 2,302,564.

A homogeneous, clear transparent polyurethane having a tensile strength (DIN 53 504) of 47 MPa at 480% breaking elongation (DIN 53 504), and the following elastomeric properties was obtained:

| | |
|---|---|
| Critical bending stress: | 5.1 MPa (DIN 53 452) |
| Notched bar impact resistance at −20° C.: | 3.6 KJ/m$^2$ (DIN 53 453) |
| Resilience: | 27% (DIN 53 512) |

EXAMPLE 1(b) (Process according to the invention)

The same starting materials as in Example 1(a) were used, but 25.0 parts by weight of the mixed polyester without the addition of activator, 0.3 parts by weight of stearyl amide, 25.0 parts by weight of butane diol-1,4 as well as 84.2 parts by weight of liquid 4,4'-diisocyanate-diphenylmethane were introduced into the feed position I and 75.0 parts by weight of the mixed polyester, activated using 12.5 ppm titanium tetrabutylate, were introduced into feed position II of the screw machine. The temperatures of the starting materials were 50° to 70° C. at feed position I and 135° C. at feed position II. The following temperature profile was adjusted on the screw machine:

| | |
|---|---|
| Heating zone 1: | 70° C. |
| Heating zone 2: | 140° C. |
| Heating zone 3: | 200° C. |
| Heating zone 4: | 180° C. |
| Heating zone 5: | 100° C. |

A homogeneous, slightly opaque polyurethane having a tensile strength of 52 MPa at 510% breaking elongation and the following improved elastomeric properties was obtained:

| | |
|---|---|
| Critical bending stress: | 6.9 MPa |
| Notched bar impact resistance at −20° C.: | 33.3 KJ/m$^2$ |
| Resilience: | 34% |

EXAMPLE 2(a) (Comparison)

50.0 parts by weight of a mixed polyester composed of adipic acid, butane diol-1,4 and ethylene glycol (hydroxyl number=56.2; acid number=0.5), 50.0 parts by weight of hexane −1,6-polycarbonate (hydroxyl number=54.8; acid number=0.1), 13.0 parts by weight of butane diol-1,4 and 49.5 parts by weight of 4,4'-diisocyanato-diphenyl-methane were introduced into the feed position I of the screw machine as in Example 1(a). A homogeneous polyurethane having good mechanical properties, but undesirably high shrinkage (6.1% after temperature adjustment) and insufficient resilience (27%) was obtained.

EXAMPLE 2(b) (Process according to the invention)

The same starting materials as in Example 2(a) were used, but 25.0 parts by weight of mixed polyester, 13.0 parts by weight of butane diol-1,4 and 49.5 parts by weight of 4,4'-diisocyanato-diphenyl-methane were introduced under the reaction conditions of Example 1(b) into the feed position I and 25.0 parts by weight of the mixed polyester and 50.0 parts by weight of the hexane diol polycarbonate were introduced into feed position II of the screw machine. A homogeneous polyurethane having equally good mechanical properties, but clearly reduced shrinkage (3.5% after temperature adjustment) and improved resilience (33%) was obtained.

EXAMPLE 3

Using the same starting materials as in Examples 1(a) and 1(b), 100.0 parts by weight of a mixed polyester composed of adipic acid, butane diol-1,4 and ethylene glycol (hydroxy number=55.4; acid number=0.7), 0.3 parts by weight of stearyl amide and 8.2 parts by weight of 4,4'-diisocyanato-diphenyl-methane were introduced in feed position I and 25.0 parts by weight of butane diol-1,4 and 76.0 parts by weight of 4,4'-diisocyanato-diphenyl-methane were introduced in feed position II of the screw machine, the following temperature profile having been adjusted on the screw machine:

| Heating zone 1: | 100° C. |
|---|---|
| Heating zone 2: | 250° C. |
| Heating zone 3: | 260° C. |
| Heating zone 4: | 200° C. |
| Heating zone 5: | 110° C. |

A homogeneous, slightly opaque polyurethane elastomer having the following properties was obtained:

| Tensile strength: | 57 MPa |
|---|---|
| Breaking elongation: | 700% |
| Critical bending stress: | 6.8 MPa |
| Notched bar impact resistance at −20° C.: | >40 KJ/m$^2$ |
| Resilience: | 39% |

EXAMPLE 4(a) (Comparison)

100.0 parts by weight of hexane diol-1,6-polycarbonate (hydroxyl number=60.0; acid number<0.1), 20.0 parts by weight of butane diol-1,4; 1.0 parts by weight of N-methyl stearyl amine; 0.2 parts by weight of stearyl acid butyl ester and 71.5 parts by weight of 4,4'-diisocyanate-diphenylmethane were introduced into the feed position I of the screw machine in a constant proportion as in Example 1(a).

The homogeneous polyurethane elastomer obtained had a tensile strength of 38.5 MPa at 400% breaking elongation, a resilience of 34% and a hardness of 57 Shore D.

EXAMPLE 4(b) (Process according to the invention)

In contrast to comparison Example 4(a), a thermoplastic polyurethane composed of 100.0 parts by weight of hexane diol-1,6-polycarbonate; 10.0 parts by weight of butane diol-1,4; 0.2 parts by weight of stearyl acid butyl ester and 42.4 parts by weight of 4,4'-diisocyanate-diphenyl-methane was produced by feeding the reactants into the metering position I into the first zones of the reaction screw to produce an intermediate. After preliminary mixing, 10.0 parts by weight of butane diol-1,4, 1.0 parts by weight of N-methyl stearyl amine and 29.1 parts by weight of 4,4'-diisocyanato-diphenyl-methane were then injected in metering position III. The thermoplastic produced had a relatively high rigidity and good resilient behavior and similarly good mechanical properties. The resilience was 37%, the hardness attained 60 Shore D.

The thermoplastic product also had an excellent flowing behavior and was particularly suitable for the production of thin moldings of large surface area.

EXAMPLE 5(a) (Comparison)

221.9 parts by weight of a prepolymer composed of 100.0 parts by weight of tetramethylene oxide polyether (molecular weight 2000) and 121.9 parts by weight of hexamethylene-1,6-diisocyanate; 60.0 parts by weight of butane diol-1,4 and 0.2 parts by weight of stearyl amide were metered in constant proportion into the feed position I of a screw machine in accordance with Example 1(a). The reaction was catalyzed using dibutyl tin dilaurate. The elastomer obtained exhibited a hardness of 57 Shore D and a critical bending stress of 12 MPa according to DIN 53 425.

EXAMPLE 5(b) (Process according to the invention)

The same starting materials as in Example 5(a) were used, but 156.6 parts by weight of a prepolymer composed of 100.0 parts by weight of tetramethylene oxide polyether (molecular weight 2000) and 56.6 parts by weight of hexamethylene-1,6-diisocyanate and 25.0 parts by weight of butane diol-1,4 and 0.2 parts by weight of stearyl amide were introduced in an identical total recipe into feed position I and, after preliminary mixing, 35.0 parts by weight butane diol-1, 4 and 65.3 parts by weight hexamethylene-1,6-diisocyanate were injected into feed position II. The reaction was again catalyzed using dibutyl tin dilaurate.

The elastomer obtained according to this process had a hardness of 60 Shore D and a critical bending stress of 15 MPa.

What is claimed is:

1. In a process for the continuous production of a polyurethane or polyurethane urea elastomer by the reaction of
    (A) a polyisocyanate,
    (B) a polyhydroxyl compound having a molecular weight of from 400 to 10,000,
    (C) a chain extender containing at least two Zerewitinoff-active hydrogen atoms, having a molecular weight below 400, and optionally,
    (D) a monoisocyanate and/or a compound which is monofunctional toward isocyanates,
    (E) and optionally, activators, stabilizers, lubricants and other additives,
    in a screw machine at temperatures in the range of 70° to 260° C., the improvement wherein one or more of components (A), (B) and (C) is introduced in at least two portions, at separate positions of said screw machine, each portion amounting to at least 4% by weight of the total quantity of the respective component.

2. A process according to claim 1, wherein the reaction is carried out in a double-shaft screw machine having screw shafts rotating in the same direction and self-cleaning screw geometry.

3. A process according to claim 2, wherein the viscosity range in the screw machine is about 0.1 to 300 Pa.s, and wherein, in order to obtain a homogeneous, lump-free end product, the critical reaction phase, in which the reaction mixture is very tacky and has a viscosity in the range between 10 and 100 Pa.s, is passed through a screw zone with intensively mixing kneading elements under the action of a kneading frequency of from 1 to 20 Hertz and at a velocity gradient in the radial clearance between comb and housing wall of more than 2000 $sec^{-1}$.

4. A process according to claim 1, wherein the total quantity of the components (A) and (C) and from 10 to 50% by weight of components (B) are introduced via a first feed position and from 90 to 50% by weight of component (B) are introduced via a second and/or third feed position of the screw machine.

5. A process according to claim 4, characterized in that the weight ratio of component (C) and the portion of component (B) introduced in feed position I lies between 0.4:1 and 3:1.

6. A process according to claim 1, that the total quantity of component (B) and from 4 to 80% by weight of component (A) are introduced via a first feed position and from 96 to 20% by weight of component (A) and the total quantity of component (C) are introduced via a second and/or third feed position of the screw machine.

7. A process according to claim 6, that the molar ratio between the reactive groups of component (B) and those of the portion of component (A) introduced in the first feed position lies between 1.2:1 and 3:1 or between 0.6:1 and 0.9:1.

8. A process according to claim 1, characterized in that the total quantity of component (B), from 10 to 80% by weight of component (A) as well as from 5 to 75% by weight of component (C) are introduced via a first feed position and from 90 to 20% by weight of component (A) as well as from 95 to 25% by weight of component (C) are introduced via a second and/or third feed position of the screw machine.

9. A process according to claim 8, characterized in that the ratio of isocyanate groups to Zerewitinoff-active groups of the components introduced in the first feed position lies between 0.90:1 and 1.20:1.

10. A process according to claim 1, characterized in that, based on the total conversion, the molar ratio of the free isocyanate group to the sum of the Zerewitinoff-active hydrogen atom lies between 0.90:1 and 1.20:1.

* * * * *